United States Patent
Shi

(10) Patent No.: US 8,244,301 B2
(45) Date of Patent: Aug. 14, 2012

(54) METHOD OF DEALING WITH CARRIER CONFLICT BETWEEN MAIN AND SUBORDINATE CARDS OF SINGLE-CHIP DUAL-CARD-DUAL-STANDBY MOBILE PHONE

(75) Inventor: Feng Shi, Shanghai (CN)

(73) Assignee: Spreadtrum Communications (Shanghai) Co., Ltd., Pudong District, Shanghai (CN)

( * ) Notice: Subject to any disclaimer, the term of this patent is extended or adjusted under 35 U.S.C. 154(b) by 796 days.

(21) Appl. No.: 12/334,445

(22) Filed: Dec. 13, 2008

(65) Prior Publication Data
US 2009/0156257 A1 Jun. 18, 2009

(30) Foreign Application Priority Data
Dec. 13, 2007 (CN) .......................... 2007 1 0172207

(51) Int. Cl.
*H04M 1/00* (2006.01)
(52) U.S. Cl. ...................... 455/558; 455/550.1; 455/557; 455/418; 235/435; 235/487
(58) Field of Classification Search .................. 455/558, 455/550.1, 557, 418; 235/435, 487
See application file for complete search history.

(56) References Cited

U.S. PATENT DOCUMENTS

| 6,356,769 | B1 * | 3/2002 | Vehmas et al. ............... 455/551 |
| 6,697,604 | B1 * | 2/2004 | Rimpela et al. ............ 455/67.14 |
| 2002/0147012 | A1 | 10/2002 | Leung |
| 2006/0234693 | A1 | 10/2006 | Isidore |
| 2008/0064443 | A1 * | 3/2008 | Shin et al. ..................... 455/558 |

FOREIGN PATENT DOCUMENTS

| CN | 1976516 | 6/2007 |
| CN | 200610156470.2 | 7/2008 |

* cited by examiner

*Primary Examiner* — Nghi H Ly

(57) ABSTRACT

The present invention provides a method for dealing with the carrier conflict between the main card and subordinate card of a single-chip dual-card-dual-standby mobile phone, which includes a set one set of antenna, RF module and baseband processing chip and further comprises a radio resource adapter layer provided between the RRC layer and the physical layer. The RRC module calculates the position of the carriers of the main card and the subordinate card. The radio resource adapter layer determines the relative position between the carriers of main card and subordinate card so as to determine the type of the conflict, set priority levels to the services of the main card and subordinate card, and process the services according to the priority levels so as to avoid the conflict.

5 Claims, 6 Drawing Sheets

METHOD OF DEALING WITH CARRIER CONFLICT BETWEEN MAIN AND SUBORDINATE CARDS OF SINGLE-CHIP DUAL-CARD-DUAL-STANDBY MOBILE PHONE

BACKGROUND OF THE INVENTION

1. Field of Invention

The present invention relates to a wireless telecommunication area, and more specifically to a method of dealing with the carrier conflict between the main and subordinate cards of a dual-card-dual-standby mobile phone.

2. Description of Related Arts

Any discussion of the prior art throughout the specification should in no way be considered as an admission that such prior art is widely known or forms part of common general knowledge in the field.

Wireless telecommunication industry developed very fast driven by the technology, market and mobile services. The mobile telecommunication devices have become a necessary part of daily life. With the increasing demand for mobile telecommunication service, many persons need two mobile phones at the same time. For example, in order to save the expensive roaming fee, the persons who usually work at different cities may need different local SIM cards at different cities respectively, so that they can user local SIM card at every city. However, changing SIM card frequently or bringing two mobile phones are very troublesome. Therefore, a dual-card-dual-standby mobile phone has been developed.

A US patent application US20060234693 discloses a single mobile phone supporting different subscriber numbers, having two SIM ports, sharing DSP and application processor and connecting to two RF modules respectively through one switching circuit. However, such mobile phone can only support two subscriber numbers respectively, and can not satisfy the demand of dual-card-dual-standby.

The current dual-card-dual-standby mobile phone usually uses two chipsets. For example, a Chinese patent application CN200610015647.0 discloses a technique scheme of two SIM cards serving at standby mode at the same time, wherein a dual-card-dual standby mobile phone includes a main device comprising a main SIM card port, a corresponding main antenna, a RF module and a baseband processing module, and an subordinate device having an subordinate SIM card port, an subordinate RF module and a subordinate baseband processing module, wherein the main baseband processing module communicates with the subordinate baseband processing module via a communication module. As shown in FIG. 1, the main device and the subordinate device use their own baseband processing module respectively, which results in high cost and large size of the dual-card-dual-standby mobile phone.

Therefore, a dual-card-dual-standby mobile phone with a single chipset is developed. A dual-card-dual-standby mobile phone with a single chipset adopts one set of antenna, RF module and baseband processing chip and other peripheral devices. In order to make sure that two SIM cards camp in their own cell respectively at the same time, the single RF chip has to be able to receive the system informations and paging messages from two carriers periodically. However, no matter whether the two carriers belong to the same operator or different operators, a single RF chip receiving two carriers has not been considered in designing the GSM network, especially in case of the two carriers belonging to different operators. Therefore, the system informations and the paging messages of two carriers may conflict with each other.

BRIEF SUMMARY OF THE INVENTION

The present invention provides a method for dealing with the service conflict between the main card and subordinate card, when a single RF chip receives the system information and paging message of the main card and subordinate card at the same time.

The present invention discloses a method for dealing with the carrier conflict between the main card and subordinate card of a single-chip dual-card-dual-standby mobile phone, which comprises one set of antenna, RF module and baseband processing chip and further comprises a radio resource adapter layer provided between the RRC layer and the physical layer, so as to detect and process the system information and paging message from the carriers of the main card and subordinate card.

The method comprises steps of:

(a) calculating the position of the system information and paging message of the main card and subordinate card, (b) determining the type of the conflict between the main card and the subordinate card, (c) setting priority levels for the services according to the type of the conflict, and (d) dealing with the service of higher priority level firstly, and abandon the service of lower priority level.

Firstly, calculate the position of the system informations of the main card and subordinate card respectively, and determine the type of the conflict according to the position relationship, so as to deal with the conflict according to the type thereof.

When a system information of the main card conflicts with a paging message of the subordinate card, arrange to receive the paging message of the subordinate card firstly and abandon the system information; when a continuous system information reception for cell reselection of the main card conflicts with a paging message of the subordinate card, continue to receive the system information of the main card firstly and abandon the paging message of the subordinate card.

When a system information of the main card conflicts with a call service of the subordinate card, and the system information of the main card is earlier than the subordinate card, and it is a originating call service of the subordinate card, arrange to continuously receive the system information of the main card for one or two times firstly and delay the access request of the subordinate card; when it is not a originating service of the subordinate card, arrange to continuously receive the system information of the main card for one time firstly and delay the access request of the subordinate card; when a system information of the main card is later than a service of the subordinate card, directly abandon the single system information reception, and delay the continuous system information reception of the main card for cell reselection until the services of the subordinate card ends.

When a system information of the main card conflicts with a system information of the subordinate card, and it is the single system information reception of both main card and subordinate card, abandon the system information of the subordinate card; when there is only one of the main card or subordinate card continuously analyzing the system information, assure the continuous system information reception firstly; when both the main card and the subordinate card continuously receive the system information, arrange the reception of the main card firstly and delay the reception of the subordinate card until the reception of the main card ends.

DETAILED DESCRIPTION OF THE INVENTION

The single-chip dual-card-dual-standby mobile phone comprises one set of antenna, RF module and baseband processing chip and other peripheral devices. Due to a single RF chip in one mobile phone, in order to make sure that two SIM cards camp in their own cell respectively at the same time, the single RF chip has to be able to receive system informations and paging messages from two carriers periodically. However, no matter whether the two carriers belong to the same operator or different operators, a single RF chip receiving two carriers has not been considered in designing the GSM network, especially in case of the two carriers belonging to different operators. Therefore, the system informations and the paging messages of two carriers may conflict with each other.

Figure 1:
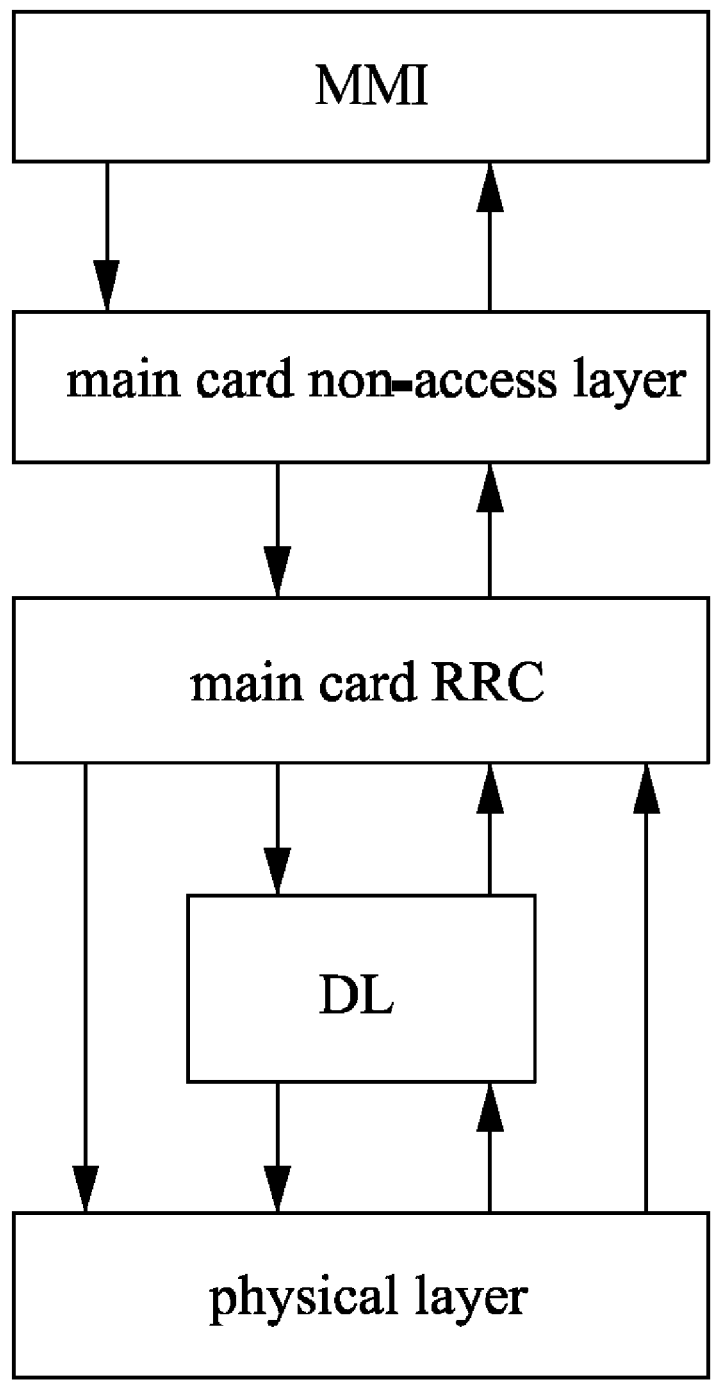
FIG. 1 is a schematic view of a systematic architecture of single-card-single-standby mobile phone according to a preferred embodiment of the present invention.
Figure 2:
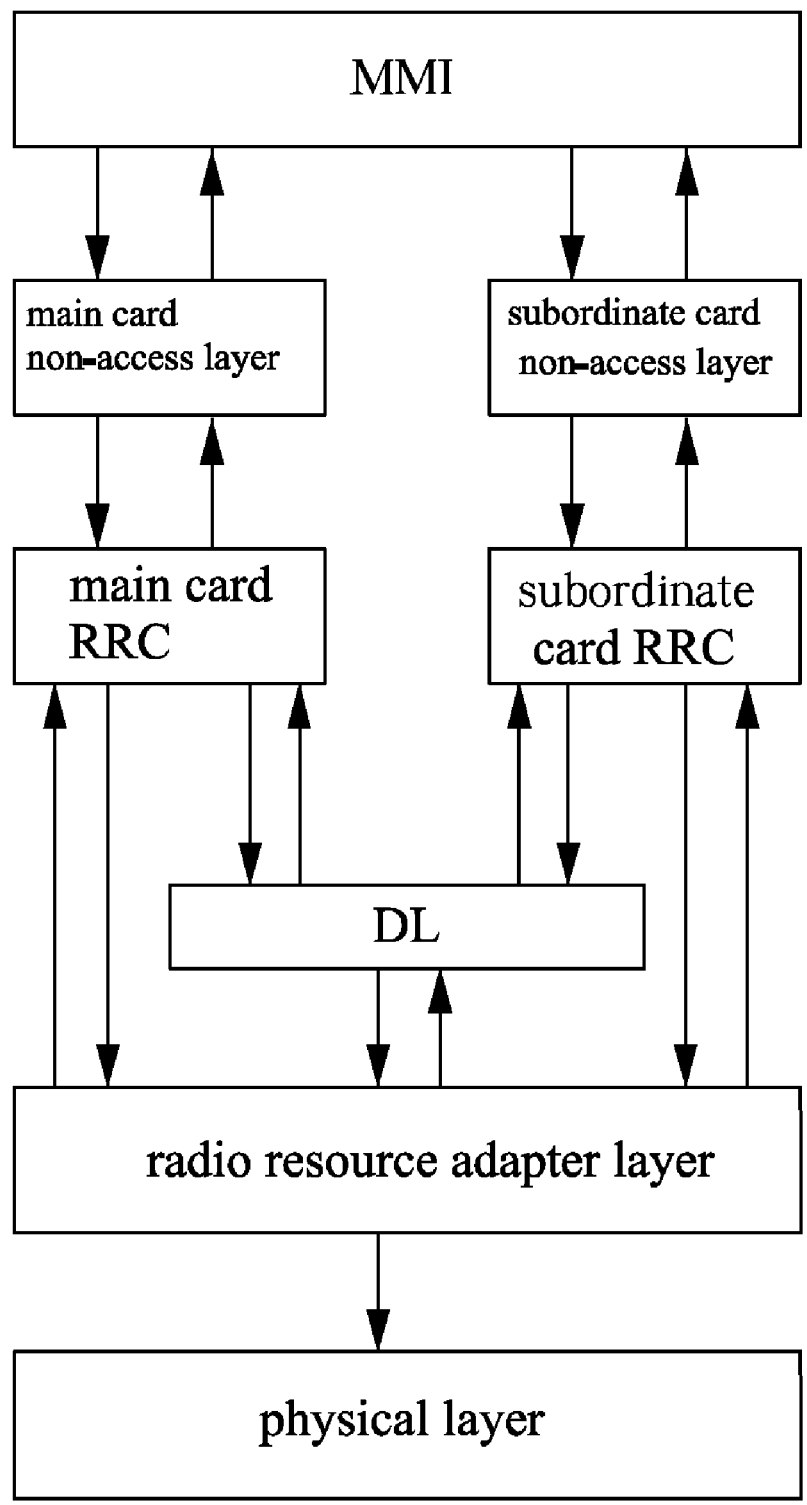
FIG. 2 is a schematic view of a systematic architecture of single-chip dual-card-dual-standby mobile phone according to the above preferred embodiment of the present invention.

Referring to FIG. 1 of the drawings, a systematic architecture of a single-card-single-standby mobile phone is illustrated, which comprises a MMI (Man-Machine Interface) layer, a main card non-access layer, a RRC (Radio Resource Control) layer and a physical layer. However, referring to FIG. 2 of the drawings, a systematic architecture of a dual-card-dual-standby mobile phone further comprises a subordinate card RRC layer, and a radio resource adapter layer provided between the RRC layer and the physical layer. When the mobile phone is turned on, the RRC module of a mobile phone will scan the frequencies, receive system informations, calculate the position of the paging messages on the carriers according to the content of the system informations and the IMSI (International Mobile Subscriber Identification Number) of the SIM cards, and receive the system informations periodically. The radio resource adapter layer determines the type of the conflict between the carriers of the main and subordinate cards according to theses position messages. The mobile phone sets different priority levels to the conflicting services, and processes conflicting services according to the priority levels.

Usually, there are several types of conflicts between the carriers of the main and subordinate cards.

Figure 3:
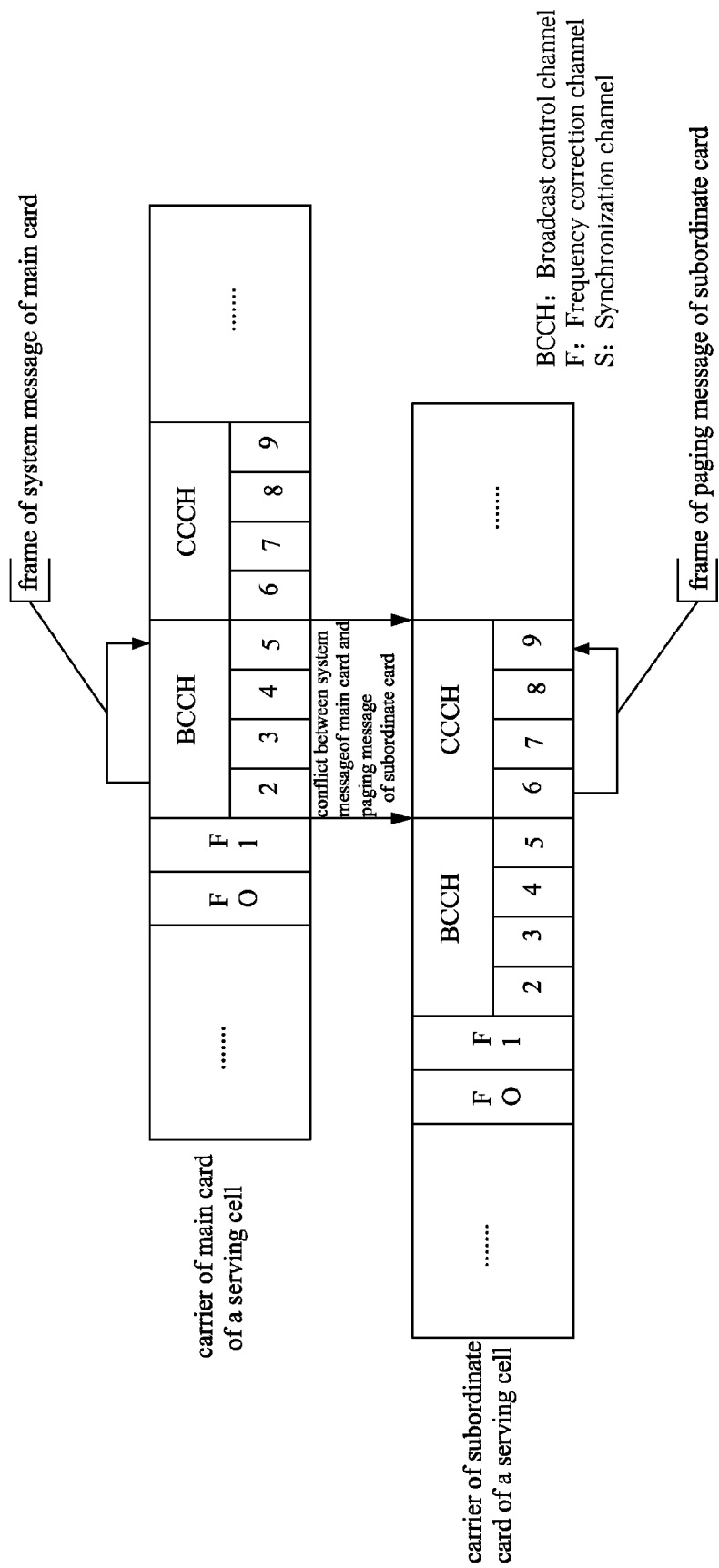
FIG. 3 is a diagram showing the conflict between a system information of the main card and a paging message of the subordinate card according to the above preferred embodiment of the present invention.

The first, as shown in FIG. 3, is the conflict between the system informations of the main card and the paging messages of the subordinate card.

Figure 4:
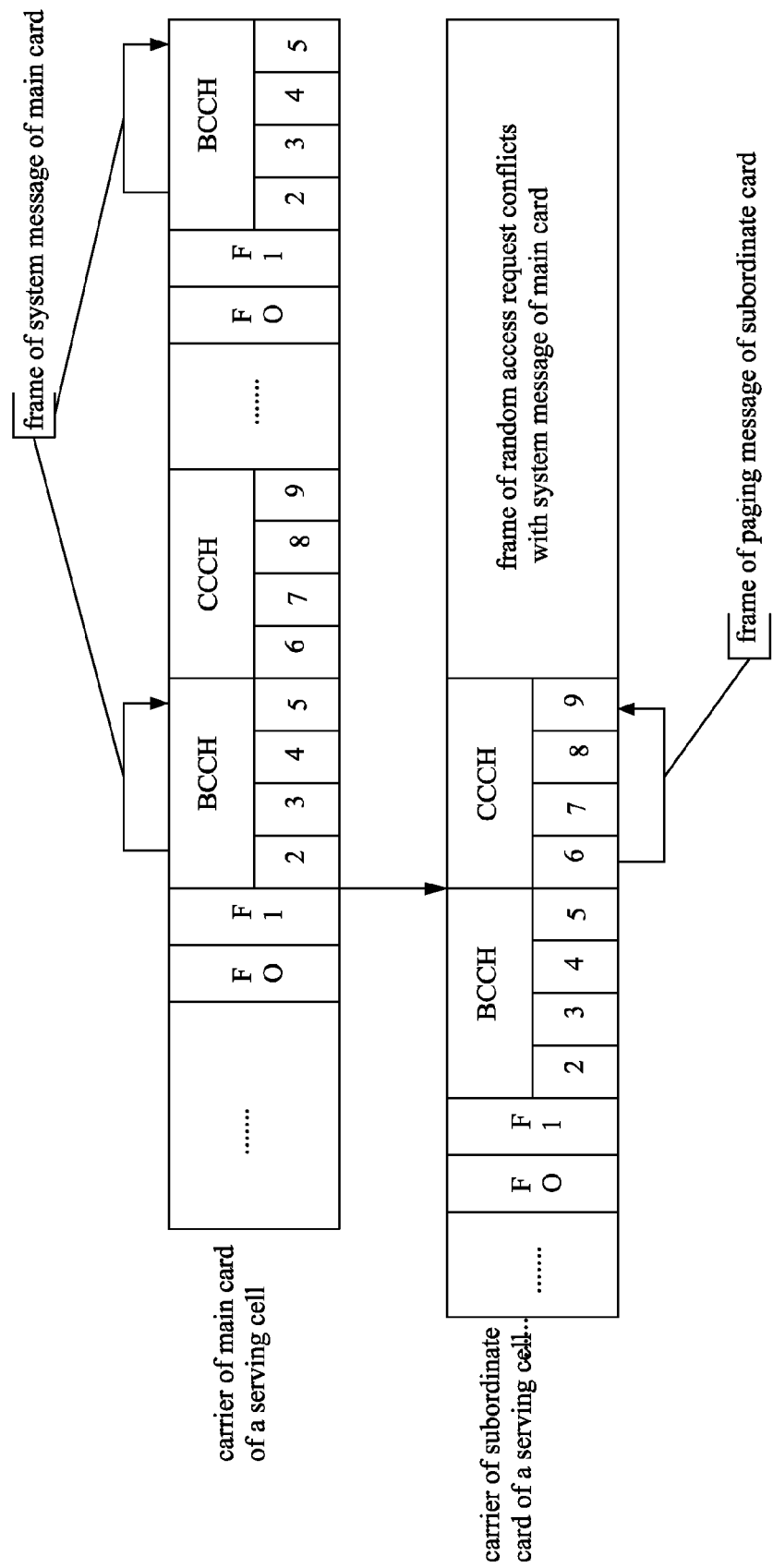
FIG. 4 is a diagram showing the conflict between a system information of the main card and a call service of the subordinate card according to the above preferred embodiment of the present invention.

The second, as shown in FIG. 4, is the conflict between the system informations of the main card and the call services and so on of the subordinate card.

Figure 5:
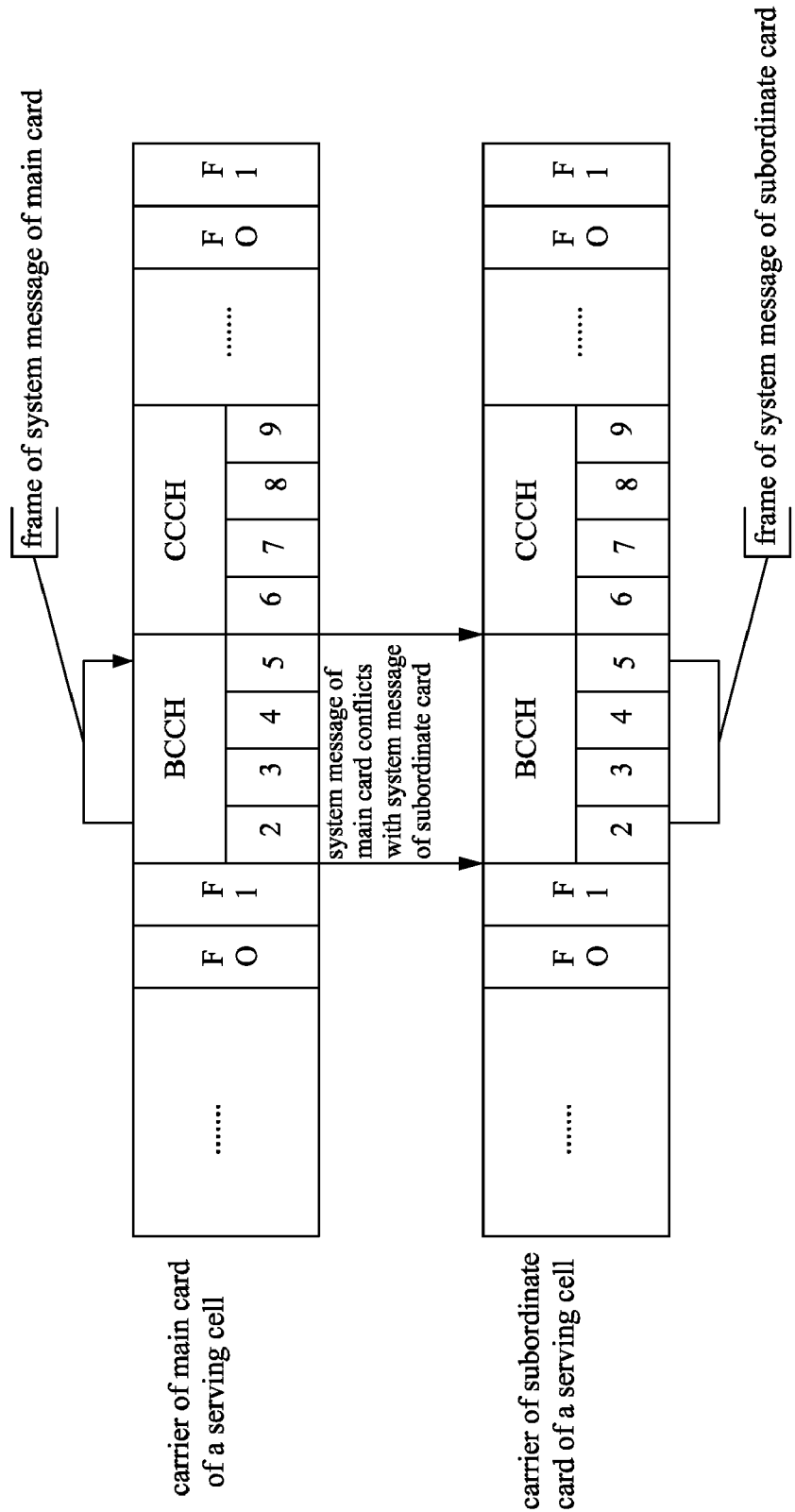
FIG. 5 is a diagram showing the conflict between a system information of the main card and a system information of the subordinate card according to the above preferred embodiment of the present invention.

The third, as shown in FIG. 5, is the conflict between the system informations of the main card and the system informations of the subordinate card.

The method for dealing with each type of the conflicts is provided respectively. As to the first type of the conflict of the dual-card-dual-standby mobile phone, the main and subordinate cards can not camp in one cell, no matter whether the cards belong to the same operator or different operators. In such case, the conflict between the system informations of the main card and the paging messages of the subordinate card easily happens. The dealing method is as follows.

When a single system information reception of the main card conflicts with a paging message of the subordinate card, arrange to receive the paging message of the subordinate card firstly and abandon the system information.

When the continuous system information reception for cell reselection of the main card conflicts with the paging message of the subordinate card, continue to receive the system information of the main card firstly and abandon the paging message of the subordinate card.

Due to the low requirement for a single system information reception, it usually takes only 5 minutes to receive the system informations relating to the cell reselection in all neighboring cells, so that abandoning such reception can save the paging message of the subordinate card, and can assure the camp of the main card. During the continuous system information reception, which is usually the cell reselection, the reception must be responded immediately, because if the reception is not responded immediately, the main card may lose paging messages or even disconnect with the network. The system information reception for cell reselection can usually complete in two seconds.

As to the second type of the conflict, that is when a system information of main card conflicts with a call service of the subordinate card, because the mobile phone can control the timing of the random access of the originating call service, the system information of the originating call service can received one more time than the system information of the terminating call service, which is a chance of cell reselection. However, when it is not an originating call service, the time for receiving system information of main card is no more than 2 seconds, which will neither affect the access of the subordinate card, nor the cell reselection of the main card. The dealing method is as follows.

When the system information of the main card is earlier than the subordinate card and it is the originating call service of the subordinate card, arrange to receive the system information of the main card for one or two times firstly and delay the access request of the subordinate card. When it is a service other than the originating call service of the subordinate card, arrange to receive the system information of the main card for one time firstly and delay the access request of the subordinate card.

When the system information of the main card is later than the service of the subordinate card, abandon the single system information reception, and delay the continuous system information reception of the main card for cell reselection until the services of the subordinate card ends.

As to the third conflict, when the system information of the main card conflicts with the system information of the subordinate card, the dealing method is as follows.

When it is the single system information reception of both main card and subordinate card, abandon the system information of the subordinate card; when there is only one continuous system information reception of main card or subordinate card, assure the continuous system information reception firstly; when both the main card and the subordinate card continuously receive system information, arrange the reception of the main card firstly and delay the reception of the subordinate card until the reception of the main card ends.

Figure 6:
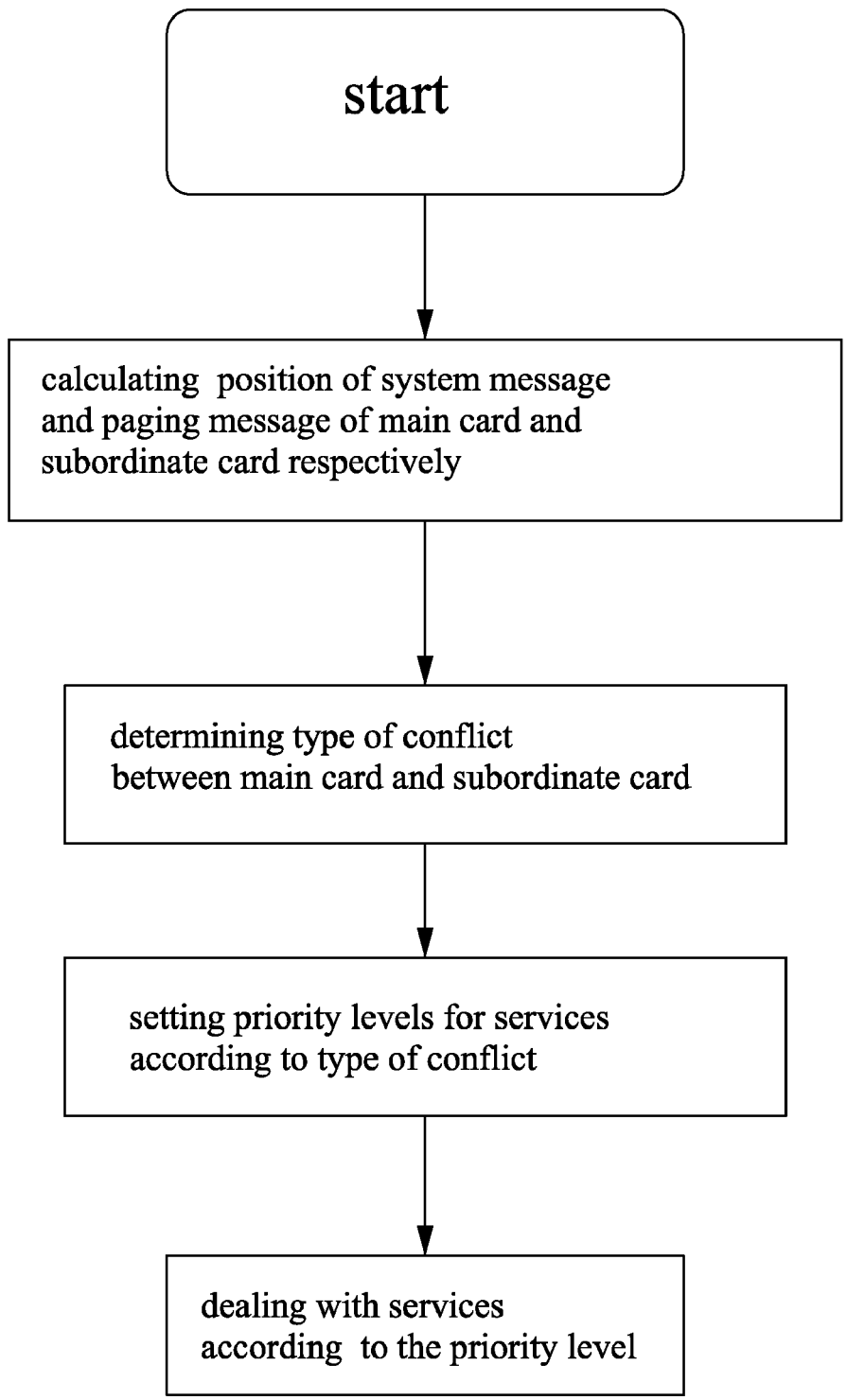
FIG. 6 is a flow chart of dealing with the carrier conflict of the main and subordinate card according to the above preferred embodiment of the present invention.

These are the dealing methods of the three types of conflict. However the carrier conflicts between the main and subordinate card of the dual-card-dual-standby mobile phone are not limited to the above-mentioned types. As shown in FIG. 6, the dealing method comprises the following steps.

Step 1: calculate the position of the system information and paging message of the main card and subordinate card.

Step 2: determine the type of the conflict between the main card and the subordinate card.

Step 3: set priority levels for the services according to the type of the conflict.

Step 4: deal with the service of higher priority level firstly, and abandon the service of lower priority level.

According to the calculation of the system informations position on carriers and the different priority levels for different services, the conflicts between the carriers can be effectively resolved, which create opportunity to further promote the single-chip dual-card-dual-standby mobile phone.

One skilled in the art will understand that the embodiment of the present invention as shown in the drawings and described above is exemplary only and not intended to be limiting. Any variation on the theme and methodology of accomplishing the same that are not described herein would be considered under the scope of the present invention.

What is claimed is:

1. A method for dealing with a carrier conflict between a main card and a subordinate card of a single-chip dual-card-dual-standby mobile phone, which comprises one set of antenna, RF module and baseband processing chip, wherein when said RF module receives system informations and paging messages from two carriers at the same time, said system informations and said paging messages of said two carriers conflict with each other to cause said carrier conflict, comprising steps of:
   (a) calculating a position of said system information and paging message of said main card and said subordinate card,
   (b) determining a type of a conflict between said main card and said subordinate card,
   (c) setting priority levels for services according to said type of said conflict, and
   (d) dealing with said service of higher priority level firstly, and abandon said service of lower priority level,
   wherein a radio resource adapter layer determines said type of said conflict between said two carriers of said main and subordinate cards according to said positions.

2. The method as recited in claim 1, wherein said radio resource adapter layer is provided between a physical layer and a radio resource control layer.

3. A method for dealing with a carrier conflict between a main card and a subordinate card of a single-chip dual-card-dual-standby mobile phone, which comprises one set of antenna, RF module and baseband processing chip, wherein when said RF module receives system informations and paging messages from two carriers at the same time, said system informations and said paging messages of said two carriers conflict with each other to cause said carrier conflict, comprising steps of:
   (a) calculating a position of said system information and paging message of said main card and said subordinate card,
   (b) determining a type of a conflict between said main card and said subordinate card,
   (c) setting priority levels for services according to said type of said conflict, and
   (d) dealing with said service of higher priority level firstly, and abandon said service of lower priority level,
   wherein when a system information of said main card conflicts with a paging message of said subordinate card, comprising steps of:
   when a single system information reception of said main card conflicts with said paging message of said subordinate card, arrange to receive said paging message of said subordinate card firstly and abandon said system information;
   when a continuous system information reception for cell reselection of said main card conflicts with a paging message of said subordinate card, continue to receive said system information of said main card firstly and abandon said paging message of said subordinate card.

4. A method for dealing with a carrier conflict between a main card and a subordinate card of a single-chip dual-card-dual-standby mobile phone, which comprises one set of antenna, RF module and baseband processing chip, wherein when said RF module receives system informations and paging messages from two carriers at the same time, said system informations and said paging messages of said two carriers conflict with each other to cause said carrier conflict, comprising steps of:
   (a) calculating a position of said system information and paging message of said main card and said subordinate card,
   (b) determining a type of a conflict between said main card and said subordinate card,
   (c) setting priority levels for services according to said type of said conflict, and
   (d) dealing with said service of higher priority level firstly, and abandon said service of lower priority level,
   wherein when a system information of said main card conflicts with a call service of said subordinate card, comprising steps of:
   when said system information of said main card is earlier than said subordinate card, and it is a originating call service of said subordinate card, arrange to continuously receive said system information of said main card for one or two times firstly and delay an access request of said subordinate card; when it is not a originating call service of said subordinate card, arrange to continuously receive said system information of said main card for one time firstly and delay an access request of the subordinate card;
   when said system information of said main card is later than a service of said subordinate card, directly abandon a single system information reception, and delay a continuous system information reception of said main card for cell reselection until said services of said subordinate card ends.

5. A method for dealing with a carrier conflict between a main card and a subordinate card of a single-chip dual-card-dual-standby mobile phone, which comprises one set of antenna, RF module and baseband processing chip, wherein when said RF module receives system informations and paging messages from two carriers at the same time, said system informations and said paging messages of said two carriers conflict with each other to cause said carrier conflict, comprising steps of:
   (a) calculating a position of said system information and paging message of said main card and said subordinate card,
   (b) determining a type of a conflict between said main card and said subordinate card, (c) setting priority levels for services according to said type of said conflict, and
(d) dealing with said service of higher priority level firstly, and abandon said service of lower priority level, wherein when a system information of said main card conflicts with a system information of said subordinate card, comprising steps of:

when it is a single system information reception of both said main card and said subordinate card, abandon said system information of said subordinate card;

when there is only one continuous system information reception of said main card and said subordinate card, assure said continuous system information reception firstly;

when both said main card and said subordinate card continuously receive the system information, arrange said reception of said main card firstly and delay said reception of said subordinate card until the reception of said main card ends.

* * * * *